United States Patent
Taurand et al.

(10) Patent No.: US 7,859,861 B2
(45) Date of Patent: Dec. 28, 2010

(54) INSULATED POWER TRANSFER DEVICE

(75) Inventors: Christophe Taurand, Valence (FR); Guillaume Vire, Valence (FR)

(73) Assignee: Thales (FR)

( * ) Notice: Subject to any disclaimer, the term of this patent is extended or adjusted under 35 U.S.C. 154(b) by 285 days.

(21) Appl. No.: 12/297,525

(22) PCT Filed: Apr. 26, 2007

(86) PCT No.: PCT/EP2007/054122
§ 371 (c)(1),
(2), (4) Date: Oct. 17, 2008

(87) PCT Pub. No.: WO2007/122268
PCT Pub. Date: Nov. 1, 2007

(65) Prior Publication Data
US 2009/0129123 A1 May 21, 2009

(30) Foreign Application Priority Data
Apr. 26, 2006 (FR) .................................. 06 03731

(51) Int. Cl.
H02M 3/335 (2006.01)
H02M 3/24 (2006.01)
(52) U.S. Cl. .......................... 363/17; 363/21.06; 363/98
(58) Field of Classification Search .................... 363/16, 363/17, 21.04, 21.06, 56.01, 56.02, 97, 98, 363/131, 132
See application file for complete search history.

(56) References Cited

U.S. PATENT DOCUMENTS

| 5,636,108 A | 6/1997 | Taurand |
| 5,745,351 A | 4/1998 | Taurand |
| 6,038,142 A | 3/2000 | Fraidlin et al. |
| 6,121,768 A | 9/2000 | Taurand |

(Continued)

FOREIGN PATENT DOCUMENTS

FR 2786339 A1 5/2000

(Continued)

OTHER PUBLICATIONS

U.S. Appl. No. 09/857,189, filed Jun. 20, 2001; Inventor: Chistophe Taurand; Application is Abandoned.

*Primary Examiner*—Matthew V Nguyen
(74) *Attorney, Agent, or Firm*—Lowe Hauptman Ham & Berner, LLP

(57) ABSTRACT

An insulated transfer device with particular topology, comprising on the primary, a switched-mode voltage step-up circuit, with a step-up inductance ($L_B$) and an active buffer stage ($D_T$, $M_T$, $C_T$) supplying a peak voltage greater than the peak voltage supplied by the input voltage source (vE) and two pairs of controlled switches controlling the application of the voltage supplied by the switched-mode voltage step-up circuit, to the terminals ($E_{p1}$, $E_{p2}$) of the primary winding and to the secondary, a full-wave rectifier with diodes ($D_{s1}$, $D_{s2}$) and controlled switches ($M_{s1}$, $M_{s2}$). On the primary, the voltage at the terminals of the capacitor $C_T$ of the active buffer stage used to apply a controlled AC voltage between the terminals Ep1 and Ep2 is regulated by controlling the time for which the controlled switches of the pairs are simultaneously in the closed state. On the secondary, Vs is regulated by controlling the time for which the secondary switches are simultaneously in the closed state.

10 Claims, 12 Drawing Sheets

U.S. PATENT DOCUMENTS

| | | | |
|---|---|---|---|
| 6,185,111 B1 * | 2/2001 | Yoshida | 363/17 |
| 6,191,957 B1 | 2/2001 | Peterson | |
| 6,285,568 B1 | 9/2001 | Taurand | |
| 6,462,558 B1 | 10/2002 | Taurand | |
| 6,473,323 B1 | 10/2002 | Taurand | |
| 6,606,022 B1 | 8/2003 | Taurand | |
| 6,862,195 B2 * | 3/2005 | Jitaru | 363/17 |
| 6,975,097 B2 | 12/2005 | Taurand et al. | |
| 6,987,680 B2 | 1/2006 | Vire et al. | |
| 7,135,847 B2 | 11/2006 | Taurand | |
| 7,199,564 B2 | 4/2007 | Taurand | |
| 7,239,534 B2 | 7/2007 | Blanc et al. | |
| 7,394,264 B2 | 7/2008 | Blanc et al. | |
| 7,796,406 B2 * | 9/2010 | Lev | 363/21.02 |
| 2002/0159280 A1 | 10/2002 | Zhu et al. | |
| 2003/0198064 A1 | 10/2003 | Zhu et al. | |
| 2007/0063670 A1 | 3/2007 | Taurand | |
| 2008/0031021 A1 | 2/2008 | Ros et al. | |
| 2008/0129258 A1 | 6/2008 | Taurand | |
| 2010/0002471 A1 * | 1/2010 | Heo et al. | 363/17 |

FOREIGN PATENT DOCUMENTS

| | | |
|---|---|---|
| WO | 2004098035 A1 | 11/2004 |

* cited by examiner

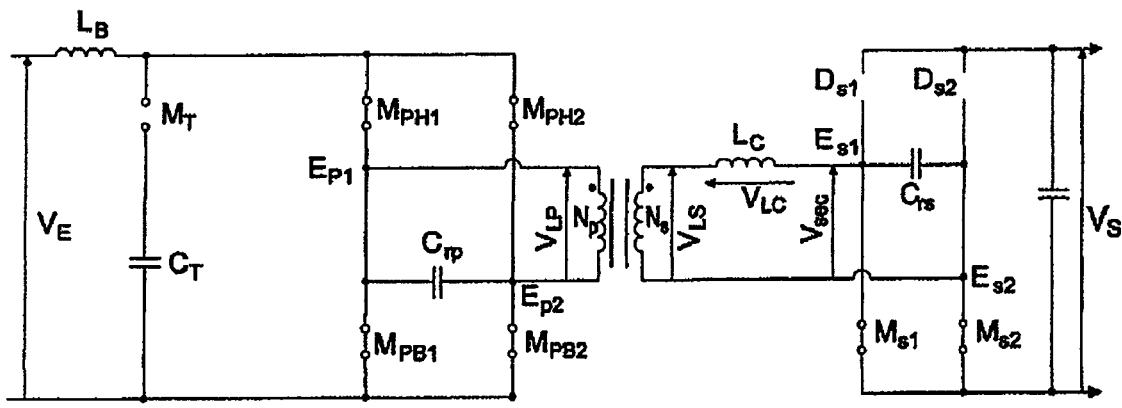
FIG.4 Phase ①
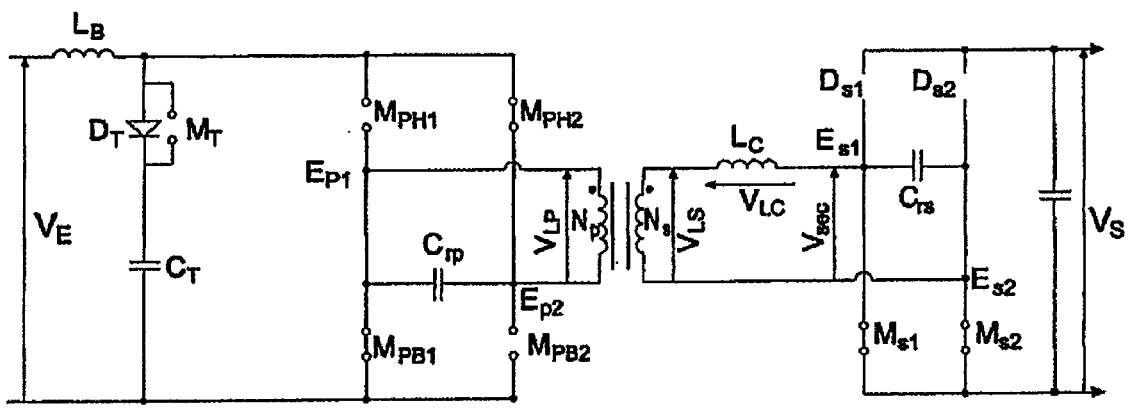
FIG.5 Phase ②
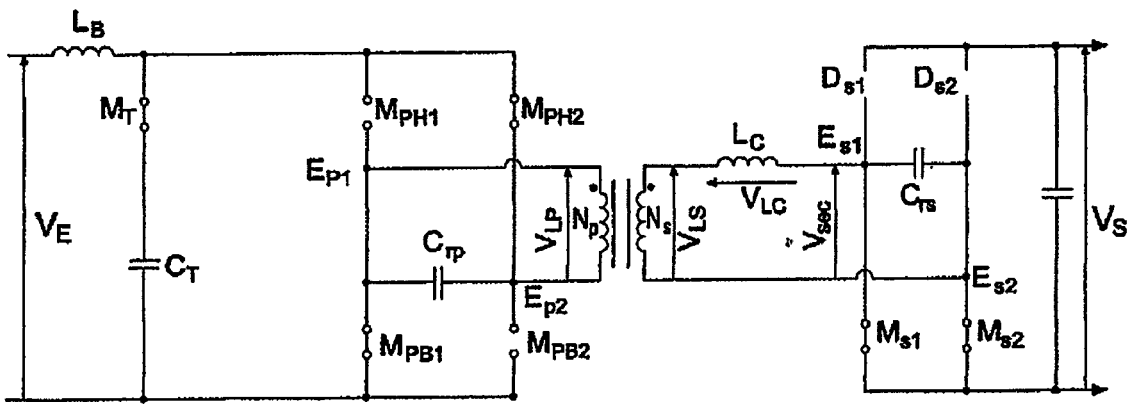
FIG.6 Phase ③

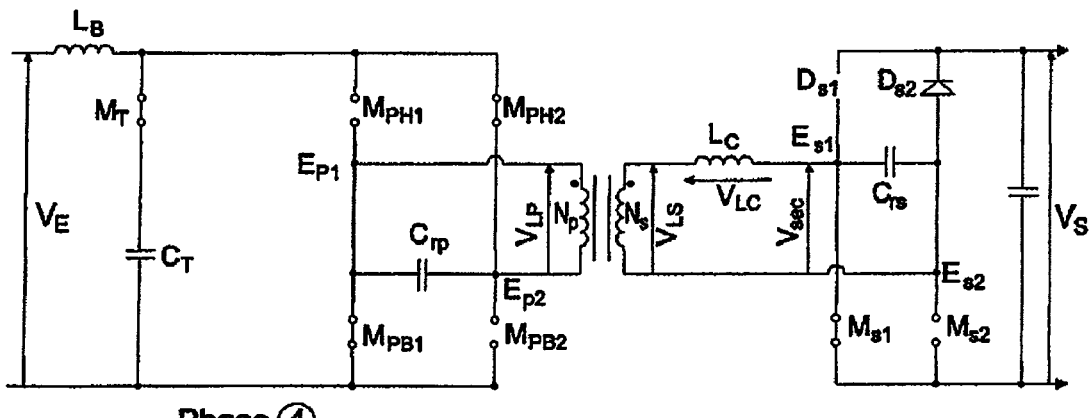
FIG.7 Phase ④
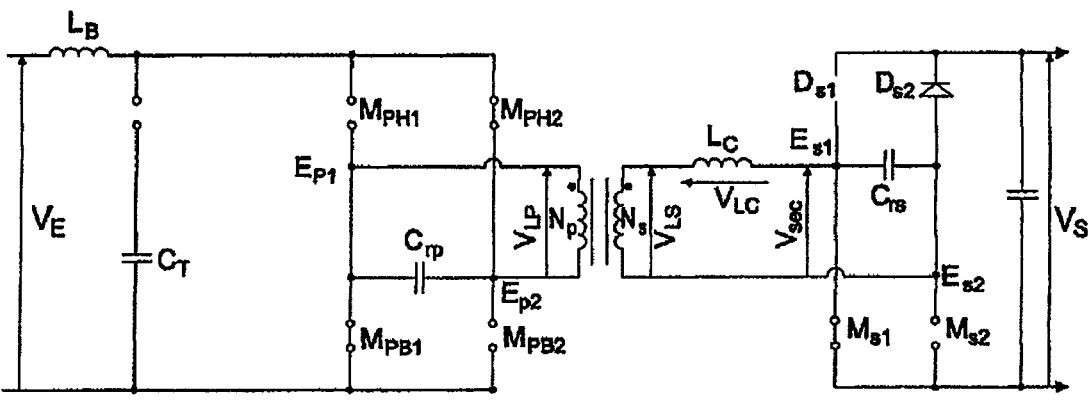
FIG.8 Phase ⑤
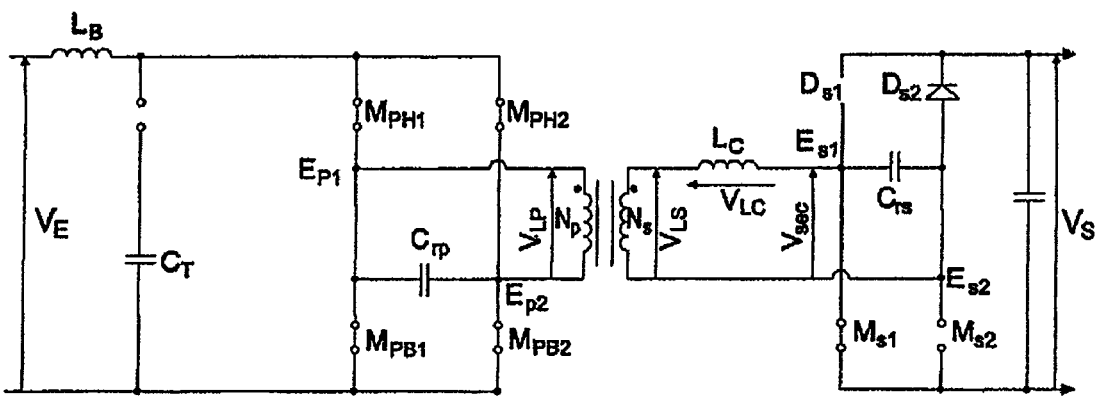
FIG.9 Phase ⑥

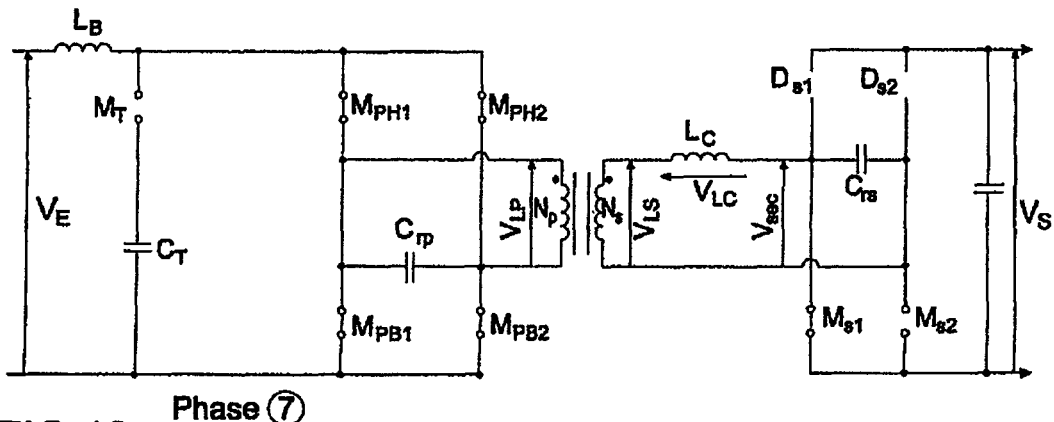
FIG.10 Phase ⑦
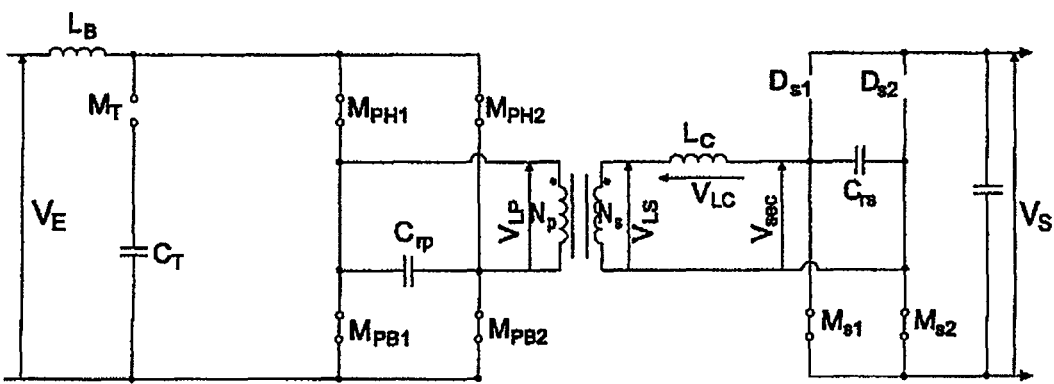
FIG.11 Phase ⑧
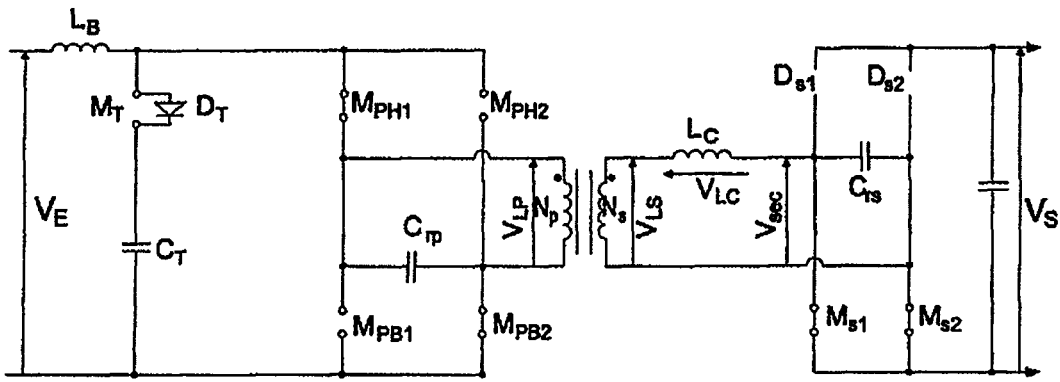
FIG.12 Phase ⑨

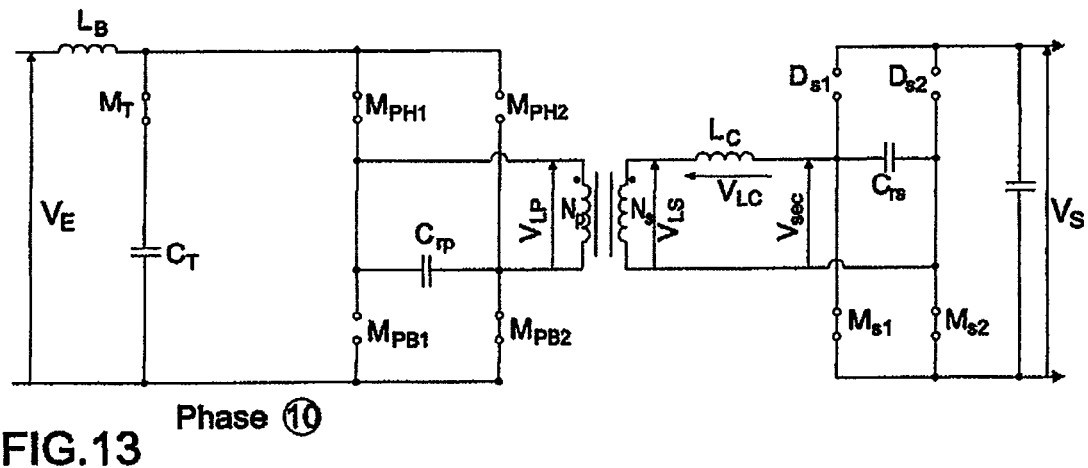
FIG.13 Phase ⑩
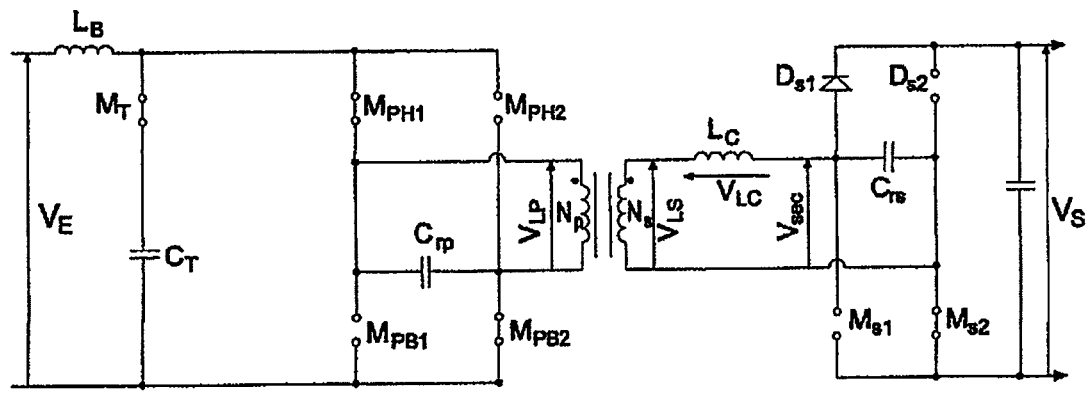
FIG.14 Phase ⑪
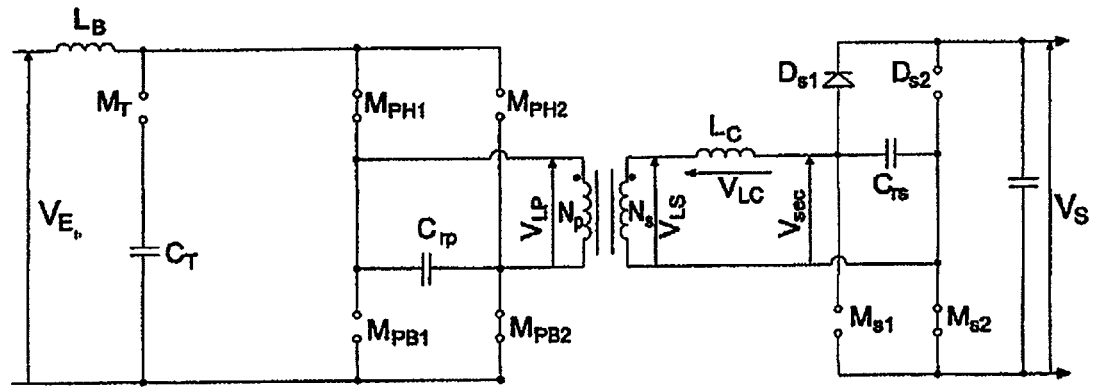
FIG.15 Phase ⑫

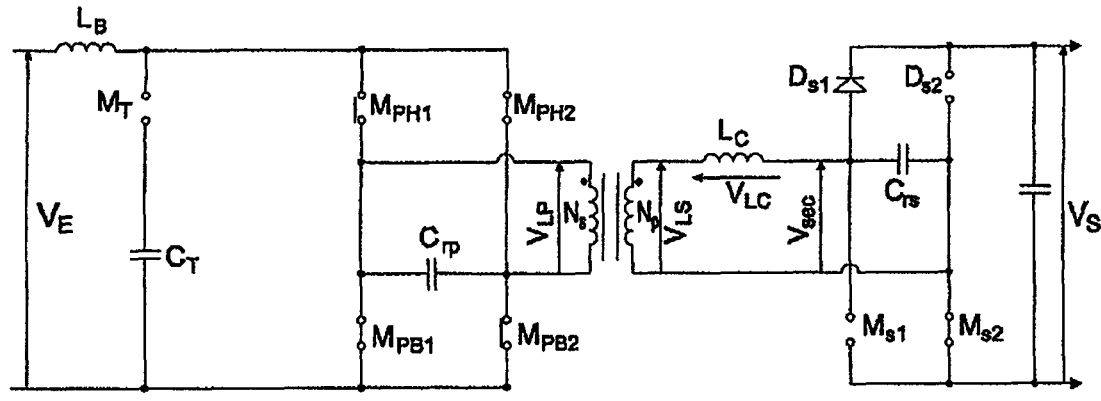
FIG.16 Phase ⑬
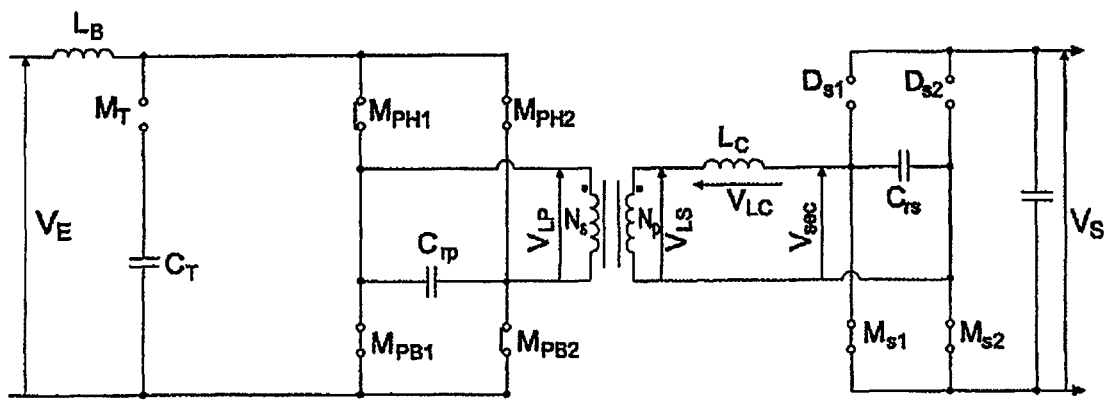
FIG.17 Phase ⑭

INSULATED POWER TRANSFER DEVICE

CROSS-REFERENCE TO RELATED APPLICATIONS

The present Application is based on International Application No. PCT/EP2007/054122, filed on Apr. 26, 2007, which in turn corresponds to French Application No. 0603731 filed on Apr. 26, 2006, and priority is hereby claimed under 35 USC §119 based on these applications. Each of these applications are hereby incorporated by reference in their entirety into the present application.

FIELD OF THE INVENTION

The present invention relates to an improved insulated power transfer device.

BACKGROUND OF THE INVENTION

For certain applications, and specifically in the field of avionics, there is a need for power transfer devices that offer the following qualities:
- a high and electrically insulated output voltage;
- a high input dynamic range, preferably greater than two (ratio between maximum input voltage and minimum input voltage);
- a transformation ratio between the value of the output voltage and the high input voltage;
- an output voltage regulated to a constant value; particularly with little susceptibility to variations of the input voltage source, which can be a battery with a voltage that is very variable in the case of a load with high current draw;
- a very small footprint;
- a high efficiency to minimize the losses and associated heating effects.

Such a device is notably sought for the starter systems of the auxiliary power units (APU) in airplanes.

The power transfer devices of the state of the art do not perfectly offer all these qualities. Notably, the French patent application published under the number 2 786 339 discloses a power transfer device of the type with magnetic coupler, with a full-wave rectifier bridge on the secondary side which forms an output voltage regulation circuit. To obtain a converter from a DC source, the device must in practice be associated with two pairs of switches in series, forming an H-configuration bridge. The AC voltage source created by the H-configuration bridge is directly connected to the terminals of the primary winding of the magnetic coupler. The magnetic coupler makes it possible to use the leakage inductance of the transformer as all or part of the storage inductance. The efficiency of the power transfer device is improved. More specifically, and as illustrated in FIG. 1a, A denotes a terminal of the load and B denotes the other terminal of the load, $C_s$ denotes the output filtering capacitor connected between A and B, Np and Ns denote the number of turns of the primary and secondary windings of the transformer, $L_f$ denotes the leakage inductance of the transformer, returned in series with the secondary winding. The rectifier bridge comprises two diodes 1 and 2, each diode connected between a respective end of the series assembly formed by the secondary winding plus leakage inductance, and the terminal A of the load. It also comprises two switches 3 and 4, each connected between a respective end of the secondary winding and the terminal B of the load. The elements 1 and 3, respectively 2 and 4, are in series between A and B. These elements 1 to 4 form a full-wave rectifier bridge. The two switches 3 and 4 are simultaneously ordered to the on state for a phase of predetermined duration, which makes it possible to store energy in the leakage inductance $L_f$. More specifically, during this phase, the storage inductance is connected to the primary voltage source and can therefore store energy. The duration of this phase can be adjusted according to the application, that is, according to the current requirements in the output load. The two diodes are naturally blocked during the energy storage phase, so as to prevent any transfer of energy to the load.

Such a magnetic coupler offers a good efficiency, of the order of 95%, but it is limited in input voltage dynamic range. In practice, the ratio of the maximum amplitude to the minimum amplitude of the input voltage must be less than or equal to two, for the device to operate optimally, that is, to retain a high efficiency. Furthermore, when the input voltage supplied by the voltage source of the primary is low, the RMS currents increase, and with them, the spectral content of the absorbed current. This causes additional losses in the semiconductors and the inductive elements and imposes a need for severe filtering of the input current, which is also a source of energy losses. In practice, these devices are at their optimum efficiency-wise and design-wise when the ratio of the input voltage and of the output voltage is equal to the transformation ratio of the transformer Np/Ns.

Also known are switched-mode step-up converters, also called "boosts" to use the standard English terminology, which can be associated with circuitry that provides electrical insulation. These boost converters have a simple topology. FIG. 1b considers an uninsulated switched-mode converter of the state of the art. It comprises a step-up inductance 5 in series with the DC voltage source $V_E$, and, following the inductance, on the one hand a diode 6 connected between the inductance and a terminal A of the load, and on the other hand a controlled switch 7 connected in series between the inductance and the other terminal B of the load. The controlled switch and the diode are thus connected in series between the terminal B and the terminal A of the load, and the mid-point of this series assembly is connected to the inductance. An output filtering capacitance Cs is provided in parallel between the terminals B and A. A converter of this type does not offer the various qualities sought in the invention. Besides the electrical insulation that is not present in such a converter, the voltage step-up ratio (output voltage divided by the minimum input voltage) that can be envisaged is limited, so that the components of the converter are not subject to too great a stress which would limit their life. In practice, this step-up ratio is limited between 5 and 10, whereas a ratio between output voltage and input voltage of between 20 and 30 is sought.

FIG. 1c represents an insulated switched-mode converter based on the same principle as the boost topology. It is distinguished from the uninsulated converter illustrated in FIG. 1b by a transformer, two switches 7a and 7b on the primary, and two diodes 6a and 6b on the secondary. The transformer comprises two primary windings Np1 and Np2 and two secondary windings Ns1 and Ns2. The primary windings are wound in opposition and have the same number of turns. Similarly, the secondary windings are wound in opposition and have the same number of turns. In the example illustrated, the switch 7a is in series with the first primary winding and the switch 7b is in series with the second primary winding. The diode 6a is in series with the first secondary winding and the diode 6b is in series with the second secondary winding. The operating principle is to switch the switches 7a and 7b to the closed state to store energy in the inductance $L_B$ as in a boost, then to switch the switch 7b to the open state, to apply a positive voltage to the first primary winding Np1. This voltage is the output voltage multiplied by the transformation ratio Np1/Ns1. The current in $L_B$ passes through the primary winding Np1 of the transformer and the switch 7a. The current in the storage inductance $L_B$ is directly transferred to the winding Ns1 and through the diode 6a while the switch 7b is open. Then, a new storage phase in $L_B$ is implemented by closing the switches 7a and 7b. Then, the switch 7a is open, a negative voltage on the second primary winding of the transformer is applied and the current in the inductance $L_B$ is transferred through the diode 6b. With such a converter, the voltage Vs obtained at the output is insulated from the primary voltage. A converter of this type makes it possible, with the transformer, to produce a high voltage ratio, but it is limited in input voltage dynamic range (ratio between the minimum input voltage and the maximum input voltage) by the spurious elements that are intrinsic to the structure. To insulate the output voltage, the transformer has a leakage inductance which modifies the shape of the currents and which generates stress on the switches and the diodes. The leakage inductance provokes a voltage-mode stress on opening of the switches which can be compensated by the addition of elements to help with the switching but which are themselves loss generators.

SUMMARY OF THE INVENTION

The subject of the invention is an improved insulated power transfer device, which does not have these various drawbacks and which presents all the qualities listed previously.

One idea on which the invention is based is to combine the device described in the abovementioned French patent application, which provides regulation to the secondary, with a switched-mode converter for which regulation on the primary is obtained, independently of the regulation on the secondary. The principle of series-connecting a boost topology converter (FIG. 1b) and a magnetic coupler (FIG. 1a) is illustrated in FIG. 1d, with two pairs of switches in series forming an H-configuration bridge between the two. All the power must pass through the boost converter on the primary and the full-wave rectifier bridge on the secondary. However, passing the power through the various components causes energy losses, notably in the diode 6 of the boost converter. It would therefore be necessary in practice to provide for such a device to be produced with large active components, controlled switches and diodes. There is then no longer a response to the demand for the requisite small footprint, and the device also becomes more costly. Another drawback is that the switch 7 of the boost converter is then controlled by hard switching, that is, when the voltage is not zero at the terminals of the switch at the time of the switching phases.

To best optimize the use of the magnetic coupler on the secondary and the switched-mode converter on the primary, the idea on which the invention is based is to modify the structure of the converter and of the coupler, notably to obtain a better efficiency of the converter, soft switching, at zero voltage at their terminals, and therefore without stress for the components, and on opening of the switches of the primary, a zero current in the leakage inductance. The invention goes beyond a simple series connection of a switched-mode converter and a magnetic coupler with regulation. A hybridation of both the power and the control law is produced, which makes it possible to obtain better performance characteristics, with a smaller material volume, and therefore with smaller components, notably less silicon surface area, a less heavy device and less dissipated heat. The switched-mode converter makes it possible to obtain a fixed optimal voltage that is independent of the variations of the input voltage, and the regulation of the coupler makes it possible to obtain on the secondary the output voltage that is required according to the output load.

More specifically, the invention proposes a particular topology of an insulated transfer device, with, on the primary, a switched-mode voltage step-up circuit supplying a voltage greater than the nominal voltage supplied by the input voltage source and two pairs of controlled switches controlling the application of the voltage supplied by the switched-mode voltage step-up circuit to the primary winding and, on the secondary, a full-wave rectifier as described in relation to FIG. 1a, which uses the leakage inductance of the transformer and a possible external inductance to store energy.

Thus, the invention relates to an insulated power transfer device connected to an output load connected between a first output terminal and a second output terminal, comprising a DC voltage source and a magnetic coupler comprising a transformer with a primary winding between two primary terminals, a secondary winding in series with a coupling inductance between two secondary terminals, said coupling inductance comprising at least the leakage inductance of the transformer;

a rectifier bridge comprising two diodes, each diode connected between a respective secondary terminal and the first output terminal, and two controlled switches, each controlled switch being connected between a respective secondary terminal and the second output terminal, and a secondary controller of said controlled switches able to set them simultaneously to the closed state for an energy storage time.

It also comprises on the primary side a voltage step-up circuit comprising:

an input inductance in series with the DC voltage source;

an active buffer stage in parallel with the series assembly formed by the input voltage source and the series inductance, said stage comprising a controlled switch with a peak-clipping diode in parallel, connected in series with a capacitor, said switch being connected to the inductance and said capacitor at the source, a first and a second pair of controlled switches in series, each pair connected in parallel with the active buffer stage and the connection point between the two switches of each pair being linked to a respective primary terminal, and a primary controller of the switches of said pairs able to set them simultaneously to the closed state for an energy storage time, to short circuit the inductance on the input voltage source, and in that the primary and secondary controllers provide independent regulation, the primary controller controlling the energy storage time on the primary to regulate the voltage at the terminals of the capacitor of the active buffer stage at a peak input voltage value, and the secondary controller controlling the energy storage time on the secondary to regulate the output voltage.

In a variant, the coupling inductance comprises the leakage inductance of the transformer and an additional inductance which can be on the primary and/or secondary winding.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1d is an illustration of the series-connection of the converter of FIG. 1b and of the coupler of FIG. 1a;

FIGS. 4 to 17 illustrate each of the topological phases of the device illustrated in FIG. 2;

DETAILED DESCRIPTION OF THE INVENTION

Figure 2A:
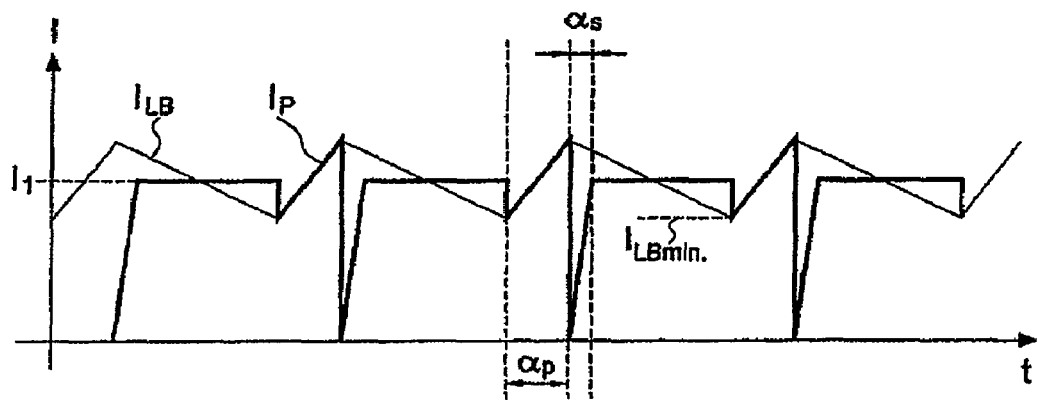
FIG. 2a is a timing diagram of the currents circulating in the device of FIG. 2.
Figure 2:
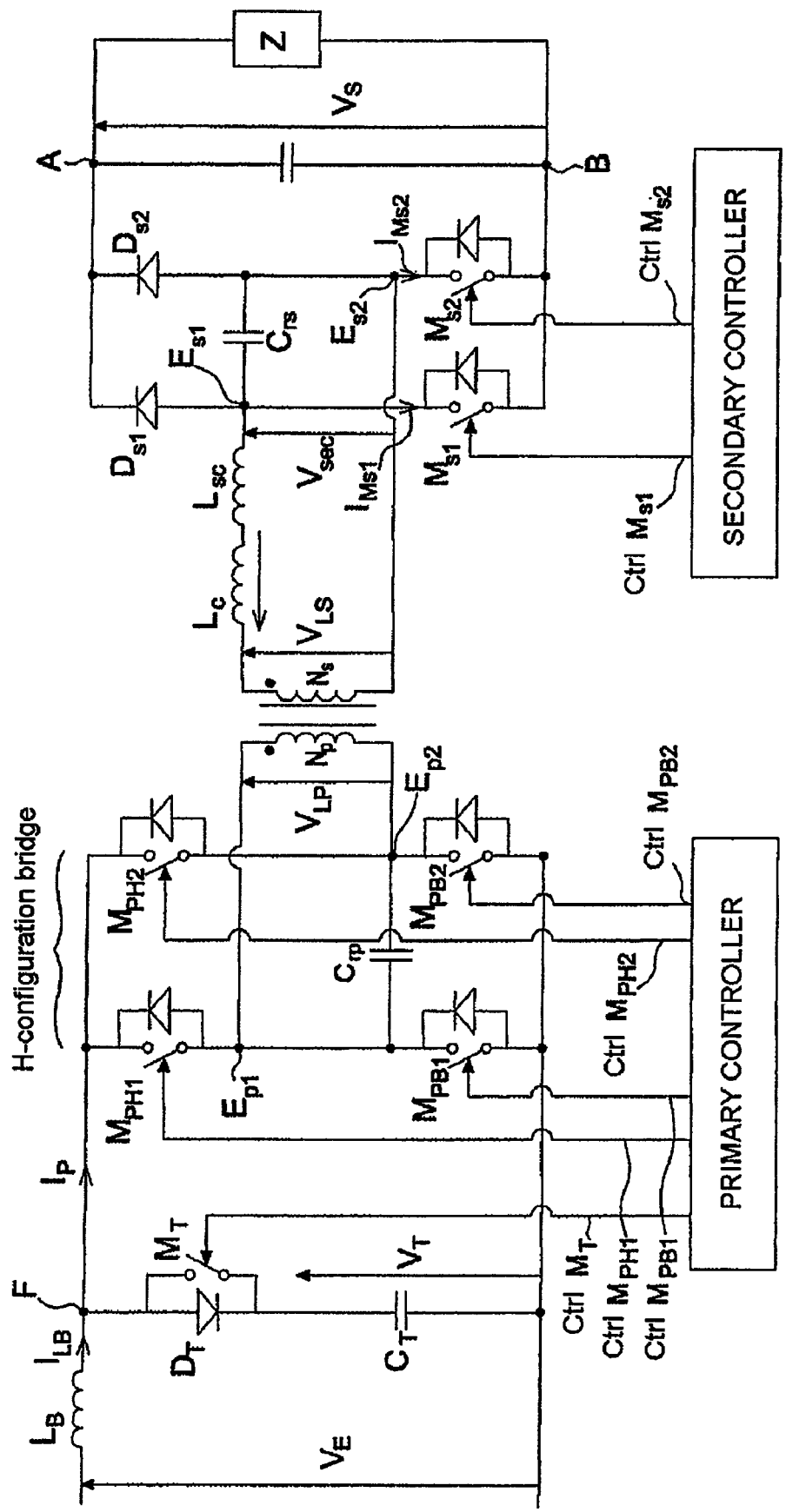
FIG. 2 illustrates an insulated power transfer device according to the invention.

FIG. 2 shows a circuit diagram of an insulated power transfer device connected to an output load Z according to the invention. The load Z is connected between a first output terminal A and a second output terminal B. The device comprises a DC voltage source $V_E$ and a magnetic coupler CM which comprises:

a transformer comprising, between two primary terminals $E_{p1}$, $E_{p2}$, a primary winding Np, and between two secondary terminals $E_{s1}$, $E_{s2}$ a secondary winding Ns in series with a coupling inductance $L_c$, said coupling inductance comprising at least the leakage inductance $L_f$ of said transformer;

a rectifier bridge comprising two diodes $D_{s1}$, $D_{s2}$, each diode connected between a respective secondary terminal $E_{s1}$, $E_{s2}$ and the first output terminal A and two controlled switches $M_{s1}$, $M_{s2}$, each switch being connected between a respective secondary terminal $E_{s1}$, $E_{s2}$ and the second output terminal B.

The insulated power transfer device according to the invention also comprises, on the primary side, a voltage step-up circuit comprising:

an input inductance $L_B$ connected in series by a first terminal to the DC voltage source $V_E$. The other terminal of the inductance $L_B$ is denoted F in the figure;

an active buffer stage in parallel with the assembly formed by said source $V_E$ and the series inductance $L_B$. This stage comprises, in series, a controlled switch $M_T$ and a capacitor $C_T$. The switch is connected to the inductance $L_B$. It is associated with a peak-clipping diode $D_T$ in parallel. The capacitor is connected to the input DC voltage source $V_E$;

and an H-configuration bridge comprising a first and a second pair of controlled switches, connected in parallel to the active buffer stage, the connection midpoint between the controlled switches of each pair being connected to a respectively primary terminal $E_{p1}$, $E_{p2}$.

The first pair comprises a first switch $M_{PH1}$ and a second switch $M_{PB1}$ in series, the connection midpoint between the two switches being linked to a primary terminal, in the example $E_{p1}$. The second pair comprises a third switch $M_{PH2}$ and a fourth switch $M_{PB2}$, the connection midpoint between the two switches being linked to the other primary terminal, in the example $E_{p2}$.

The controlled switches on the primary and on the secondary are advantageously semiconductor-type switches. They can, for example, be bipolar, MOSFET, IGBT, GTO or other type switches, without this list being exhaustive. It has been seen that the coupling inductance $L_c$ is formed by the leakage inductance $L_f$ of the transformer. It can also comprise an additional inductance, denoted $L_{sc}$ in FIG. 2, which can in practice be an additional inductance placed on the primary and/or secondary winding (to simplify the representation, the inductance is represented only on the secondary side in FIG. 2).

Also represented in FIG. 2 are the primary $C_{rp}$ and secondary $C_{rs}$. resonance capacitances. On the primary side, the resonance capacitance $C_{rp}$ in parallel with the primary terminals $E_{p1}$ and $E_{p2}$, corresponds to the equivalent spurious capacitances of the primary controlled switches $M_{PH1}$, $M_{PB1}$, $M_{PH2}$, $M_{PB2}$. On the secondary side, the resonance capacitance $C_{rs}$ in parallel with the secondary terminals $E_{s1}$ and $E_{s2}$ corresponds to the equivalent spurious capacitances of the secondary controlled switches $M_{s1}$, $M_{s2}$. Additional external capacitances can be provided.

On the primary, one function of the active buffer stage is to set the voltage applied to the H-configuration bridge (or to the pairs of switches in series) on the primary of the transformer to a chosen value greater than the maximum of the input voltage supplied by the source. The active buffer stage is also used to widen the range of the input voltage, by the charge of the capacitor $C_T$ of the buffer stage, to a voltage level greater than the peak voltage of the input voltage source.

More specifically, after a short-circuit phase on the inductance $L_B$, the voltage at the terminals of $M_T$ is naturally cancelled, the diode $D_T$ (or "clamp" diode) starts to conduct, then the switch $M_T$ of the active buffer stage is closed and the source charges the capacitor $C_T$. In the case where the controlled switch $M_T$ is a Mosfet transistor, the peak-clipping diode can be the source-drain spurious diode intrinsic to the Mosfet.

The assembly formed by the two pairs of controlled switches are arranged between the active buffer stage and the primary winding enables separate regulation of the voltage on the primary and on the secondary, and the provision to the terminals of the primary winding of a voltage having a good wave form.

A device such as that represented in FIG. 2 can be used to supply a high voltage output, insulated from the regulated voltage available at the terminals of the active buffer stage.

More specifically, the optimum voltage value on the primary is regulated by the time during which the four controlled switches of the primary are simultaneously maintained in the closed state, that is, the time during which the input inductance is in short circuit with the input voltage source and stores energy. In practice, the control of the pairs of controlled switches is determined for the voltage at the terminals of the capacitor $C_T$ of the active buffer stage to have a value roughly equal to the output voltage Vs available on the load, to within the transformation ratio Np/Ns. This regulation can be performed in voltage mode, or in current mode, by means of a control circuit.

Thus, the regulation on the primary and on the secondary relies mainly on the closed state control time of the controlled switches of the primary and on the closed state control time of the controlled switches of the secondary.

To simplify, the notations $N_p$ and $N_s$ are used in the text and the drawings both to designate the primary or secondary winding, and their number of turns which conditions the transformation ratio.

The other following notations are also used:

$V_{CT}$: voltage at the terminals of the capacitor $C_T$ of the active buffer stage;

$V_{Lp}$: voltage between the secondary terminals $E_{s1}$ and $E_{s2}$ (therefore between the series secondary inductance and coupling inductance assembly);

$I_{Lp}$: input current in the primary winding $N_p$;

$V_{Ls}$: voltage at the terminals of the secondary winding $N_s$;

$I_{Ls}$: output current of the secondary winding $N_s$ and of the coupling inductance $L_c$;

$V_{Lc}$: voltage at the terminals of the coupling inductance $L_C$;

$V_{sec}$: secondary voltage, between the terminals $E_{s1}$ and $E_{s2}$;

$V_S$: output voltage, at the output terminals A and B of the load.

Figure 18:
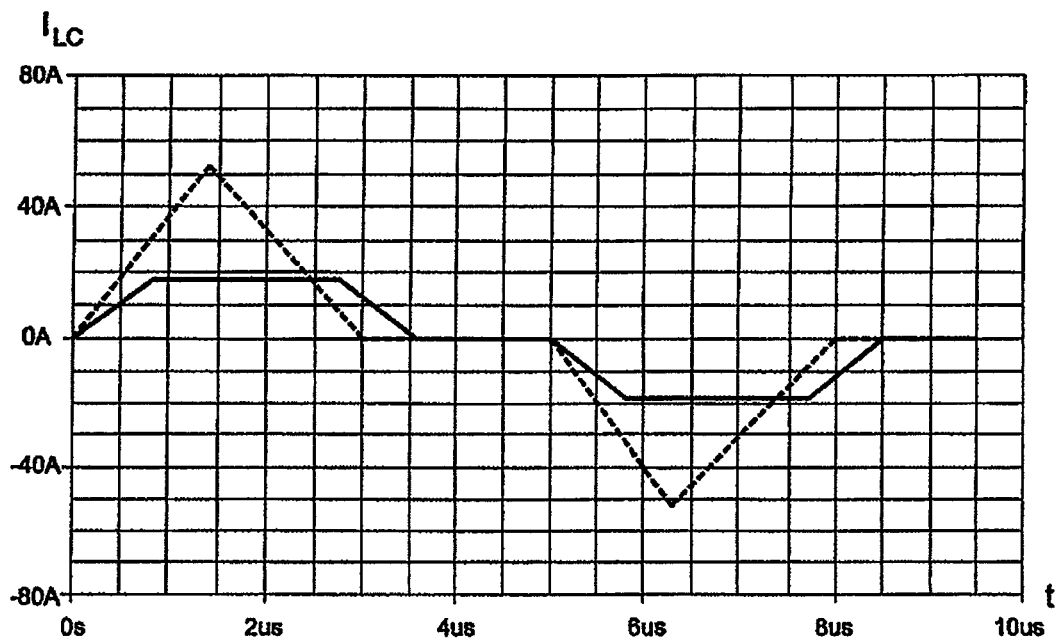
FIGS. 18 and 19 respectively show the wave form of the current and the spectral content of the current in the invention and in a device according to the French patent application FR 2 786 339.
Figure 19:
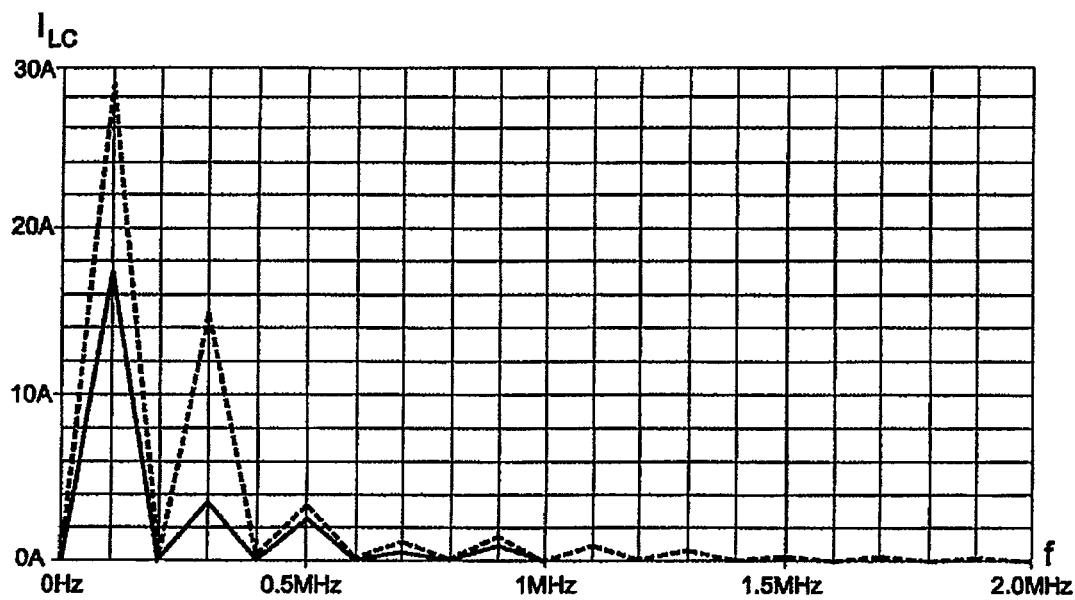

The output current $I_{LS}$ is equal to the ratio of the number of turns $N_p$ of the primary winding to the number of turns $N_s$ of the secondary winding, times the input current $I_{LP}$. This current $I_{LS}$ is the current passing into the coupling inductance $L_c$. It has a 3-level trapezoidal form, including a zero level, such that the mean value of the current is zero. Its spectral content is much better than in the devices of the state of the art. In particular, it is much better than that obtained in the coupling inductance of the magnetic coupler alone as described in the abovementioned application FR 2 786 339, as illustrated in FIGS. 18 and 19. Solid lines are used to represent the wave form of the current as a function of time in FIG. 18 and its spectral content (FIG. 19). Broken lines are used for the corresponding curves for a device according to the patent application FR 2 786 339. This clearly shows the advantages obtained according to the invention.

These advantages are obtained by a separate regulation on the primary and on the secondary, and more particularly by the control of the duration of the simultaneous closed state control time of the switches of the pairs of the primary on the one hand, and of the switches of the rectifier on the secondary.

This control is performed separately on the primary and on the secondary, by means of corresponding primary and secondary controllers as diagrammatically illustrated in FIG. 2. The primary control is based on the regulation of the voltage at the terminals of $C_T$. The secondary control is based on the regulation of the voltage $V_s$.

Concerning the regulation on the primary, the voltage $V_{CT}$ at the terminals of the capacitor $C_T$ of the active buffer stage is regulated to a value close to $V_s*Np/Ns$, in steady-state regime, by control of the energy storage phase in the input inductance. This storage phase is obtained by the short circuiting of the input inductance on the input source $V_E$, by simultaneously setting all the controlled switches to the closed state.

This regulation can be obtained in voltage mode or in current mode.

Figure 20:
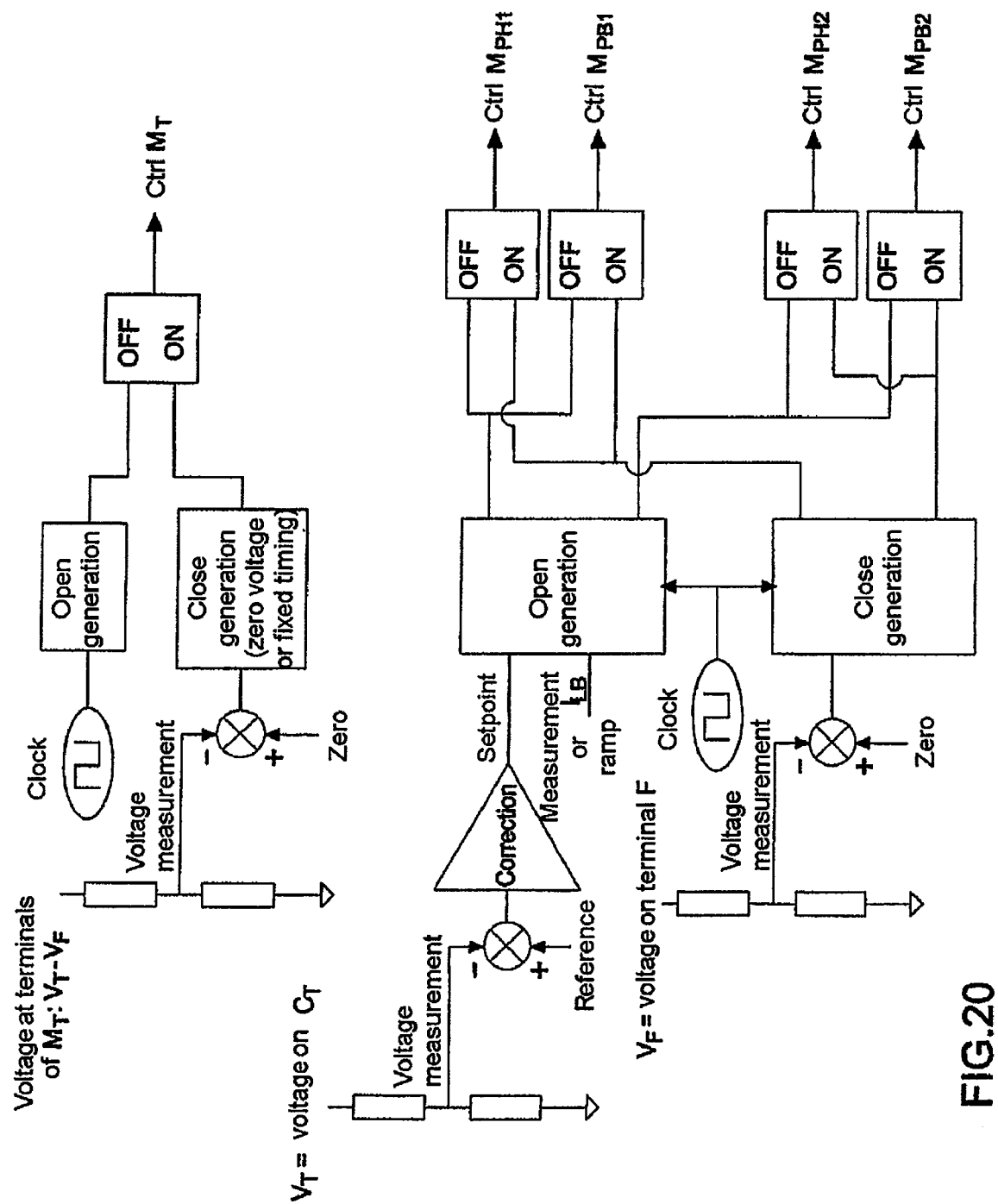
FIGS. 20 and 21 respectively illustrate an example of corresponding primary controller and secondary controller.

More specifically, and as illustrated in FIG. 20, on the primary, the voltage $V_T$ is measured and compared to a reference Ref1. The difference is input into a corrector which generates a setpoint voltage.

In the case of a voltage mode regulation, the setpoint will be compared to a ramp which leads to the opening of the switches $M_{PH1}$ and $M_{PB1}$ or $M_{PH2}$ and $M_{PB2}$ depending on the phase. In the case of a current mode regulation, the setpoint will be compared to a current measurement in the inductance $L_B$ which leads to the opening of the switches $M_{PH1}$ and $M_{PB1}$ or $M_{PH2}$ and $M_{PB2}$ depending on the phase.

The switch $M_T$ is closed by the detection of a zero voltage at its terminals (voltage $V_T$-$V_F$) or after a fixed predetermined waiting time. The switch $M_T$ is opened by a rising edge of a chopping clock. This chopping clock corresponds to a clock of period equal to the operating period T of the converter divided by 2. The switches $M_{PH1}$ and $M_{PB1}$ and $M_{PH2}$ and $M_{PB2}$ are closed by the detection of zero voltage at F, corresponding to the terminal of the inductance $L_B$ which is connected to the switch $M_T$ or after a maximum delay after the opening of $M_T$.

The primary regulation determines the duty cycle αp in steady-state regime (equal to $(V_T-V_E)/V_T$) which corresponds to the time αp*T/2 to establish simultaneous conduction of the controlled switches of the pairs of the primary $M_{PTH1}$, $M_{PTB1}$ $M_{PTH2}$, $M_{PTB2}$, when the switch $M_T$ is in the open state, which corresponds to an energy storage phase in the input inductance $L_B$, where T is the chopping period. In other words, the regulation of the voltage on the buffer capacitance is obtained by controlling the time αp*T/2 for which the controlled switches of the pairs are simultaneously in the closed state. Immediately the regulation value is reached, an open state (or OFF) switching command is applied to the switches of one of the pairs, for example to $M_{PH1}$ and $M_{PB2}$. This is what marks the end of the energy storage phase.

This primary regulation, independent of the secondary regulation, is advantageously controlled for the voltage $V_T$ charged by the capacitor $C_T$ of the active buffer stage to be greater than the peak value of the input voltage, or $V_T >V_{E-MAX}$, and preferably than a value equal to or close to $V_s*Np/Ns$. The voltage drop $V_D$ of the secondary rectifier diodes must be taken into account to have an optimally designed converter. Taking this into account leads to an adjustment of the voltage $V_T$.

In practice, there is a dead time between the moment when the switch $M_T$ is ordered to the open state and the moment when the switches $M_{PTH1}$, $M_{PTB1}$ $M_{PTH2}$, $M_{PTB2}$ are ordered to the closed state. This delay between the order to switch the switch $M_T$ of the active buffer stage to the open state, to change to the energy storage phase in the input inductance $L_B$, and the order to switch the primary controlled switches to the closed state to short circuit the input of the primary transformer, is used to switch the switches from the open state to the closed state at zero voltage at the terminals of these switches, that is, a soft switching, without stress on the switches, which reduces the switching losses.

Figure 21:
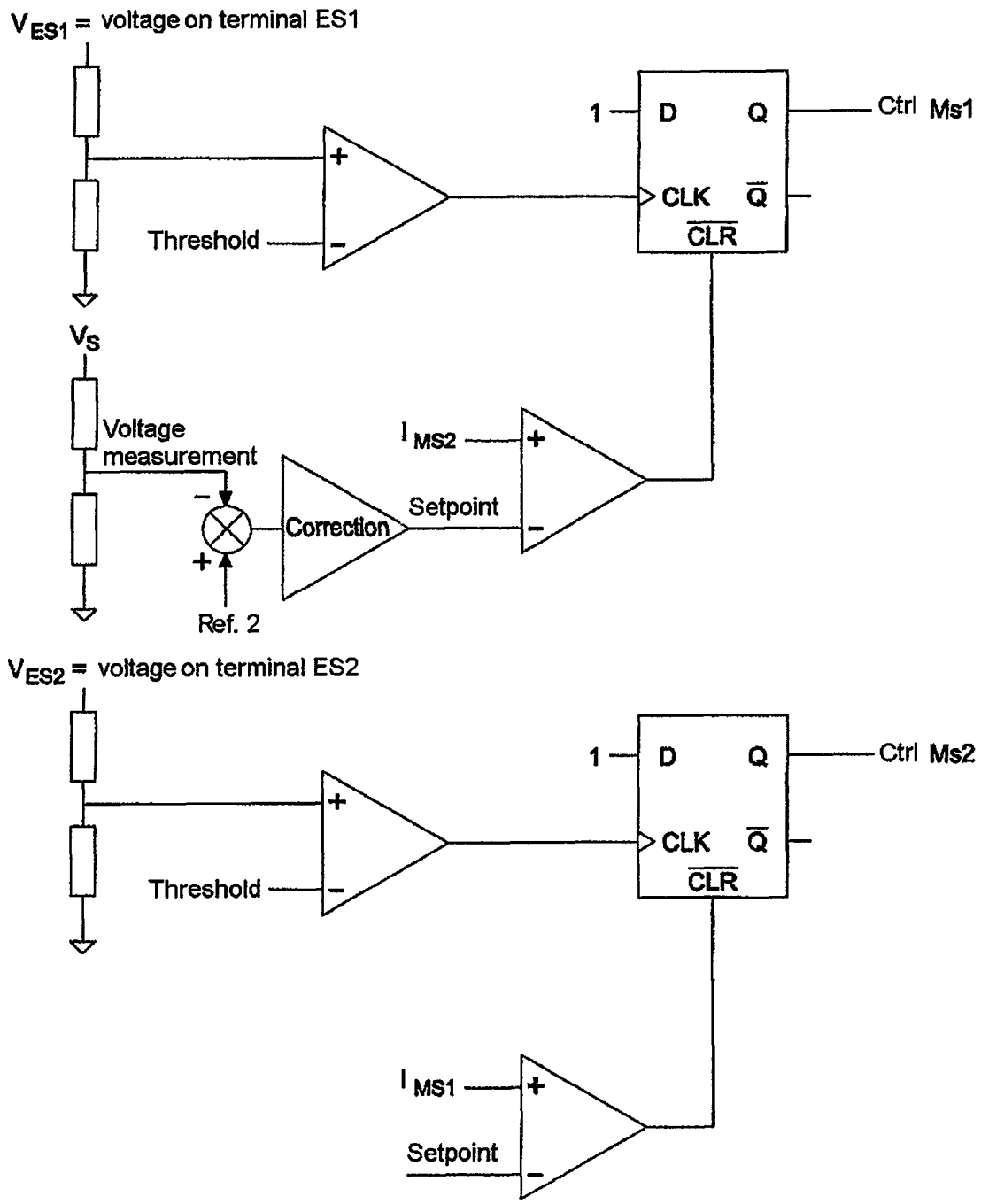

On the secondary side, the regulation of the output voltage $V_s$ is provided by controlling the time αs*T/2 to establish simultaneous conduction of the controlled switches of the secondary $M_{s1}$ and $M_{s2}$ during which the value of the current in $L_s$ is non-zero. This is advantageously obtained according to the measurement of the current drawn by the output load by a corresponding control cell. This regulation on the secondary is provided by a regulation controller as diagrammatically illustrated in FIG. 21, based on the observation of the currents $I_{Ms1}$, $I_{Ms2}$ in the secondary switches, of the voltages $V_{Es1}$, $V_{Es2}$ at the terminals $E_{s1}$ and $E_{s2}$, and on the output voltage $V_s$.

In such a controller, the output voltage $V_s$ is measured and compared to a reference Ref2. The difference is input into a corrector which generates a setpoint voltage. In the case of a voltage mode regulation, the setpoint will be compared to a ramp (sawtooth form) which leads to the opening of the switches $M_{s1}$ and $M_{s2}$ depending on the phase. In the case of a current mode regulation as illustrated, the setpoint will be compared to a current measurement $I_{Ms2}$ to order the opening of $M_{s1}$, and $I_{Ms1}$ to order the opening of $M_{s2}$. The switch $M_{s1}$ is ordered to close by the detection of zero voltage at $E_{s1}$ and the switch $M_{s2}$ is ordered to close by the detection of zero voltage at $E_{s2}$.

Generally, the precise study of the topology requires the addition of a control on the maximum duty cycle value and peak current to avoid switching to the output power reduction modes when the duty cycle is too high. In practice, the curve representing the output power as a function of duty cycle αs passes through a maximum for a value of αs less than 1 (inverted parabola-shaped curve) and therefore, to ensure the stability of the converter, it is essential for the duty cycle to be limited to the value of αs for which the maximum power is obtained. The control diagrams proposed as an example show that the converter can be servo-controlled without problems, but they are not exhaustive.

Figure 1A:
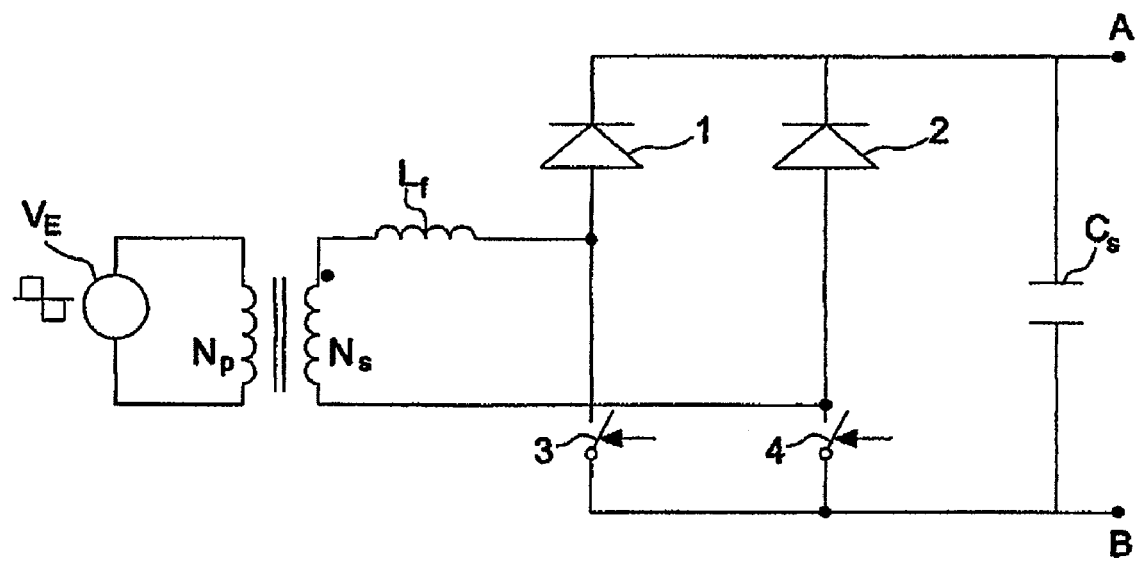
FIG. 1a is a circuit diagram of a magnetic coupler according to the state of the art.
Figure 1B:
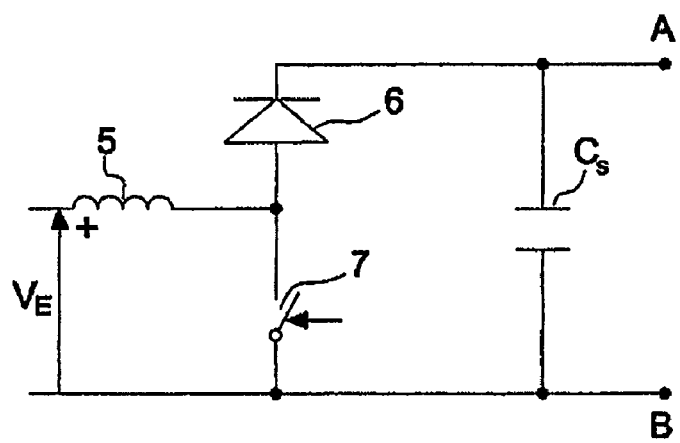
FIG. 1b is a circuit diagram of an uninsulated switched-mode converter of the state of the art.
Figure 1C:
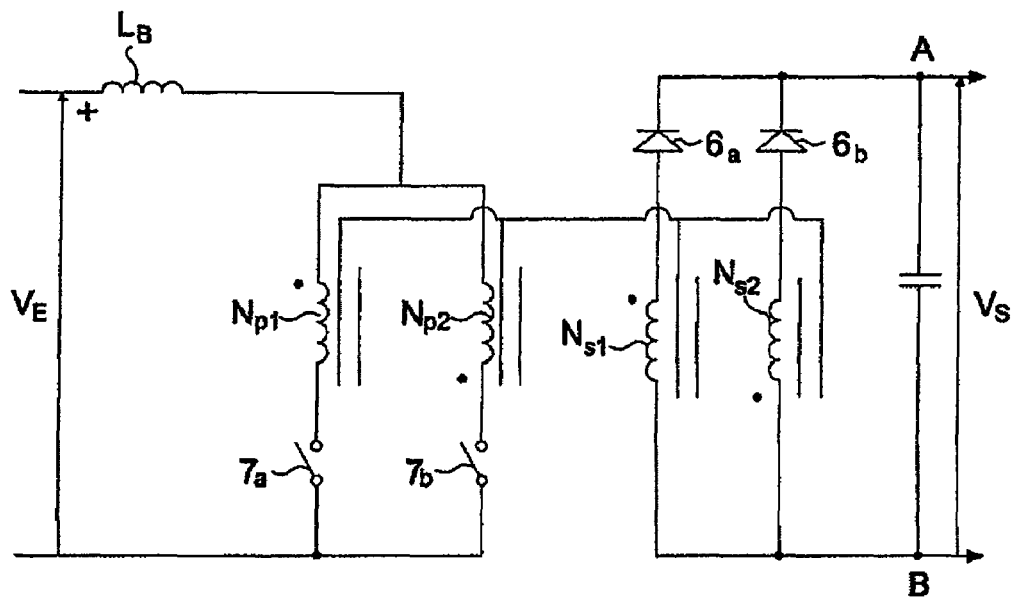
FIG. 1c is a circuit diagram of an insulated switched-mode converter of the state of the art.
Figure 1D:
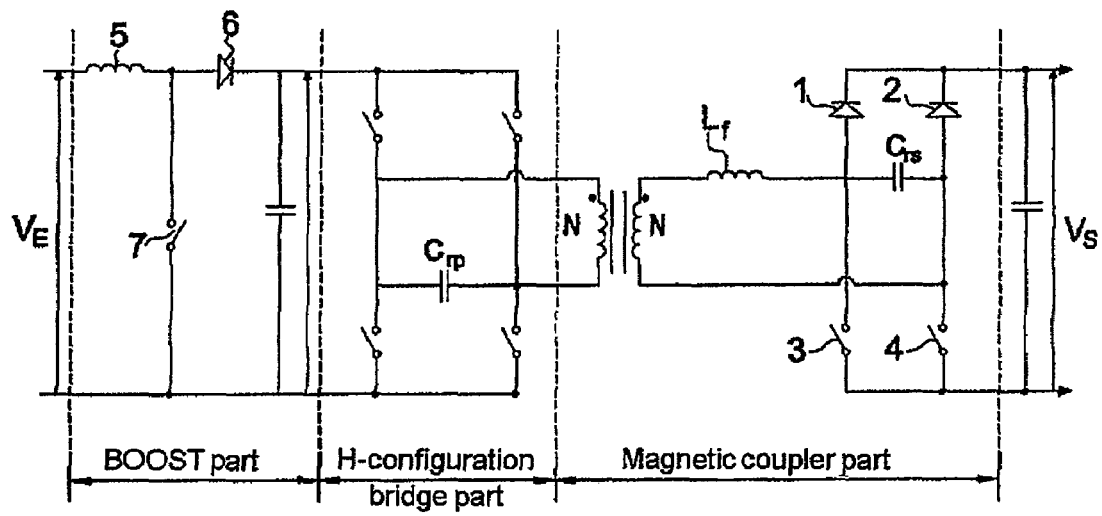

The invention makes it possible to do away with the diode of the BOOST topology which is a loss generator. It provides for all the switches to switch at zero voltage, notably by opening the switching transistor $M_T$ of the active buffer stage. Such soft switching eliminates the harmful influences of the spurious elements, including the capacitances that degrade the efficiency of the insulated BOOST of FIG. 1c. Furthermore, the inductances ($L_B$ and $L_c/L_{sc}$) are still used between two points which form a circuit with almost zero impedance at high frequency (output and buffer capacitances) which prevents the generation of transient overvoltages. By reducing the value of the RMS currents in the semiconductors, the invention provides a way of optimizing the surface area requirements of this component.

The detail of operation is described with reference to the timing diagram illustrated in FIG. 3 and to the circuit diagrams at each phase of operation illustrated in FIG. 4 and subsequent. In these diagrams, the switches ordered to the closed or "ON" state are represented by a short circuit and those ordered to the open or OFF state by an open circuit. By convention adopted in these figures, the closed state of the switches is obtained by an activation command in the high state, and the closed state of the switches is obtained by a command in the low state. In the case where these switches are Mosfet transistors, the activation command is a voltage signal applied to their gate, and the closed or "ON" state indicates that these switches are in the conducting state, and the open or "OFF" state indicates that they are in the blocked state. This FIG. 3 clearly shows that all the switching operations take place at zero voltage (controlled switches) or zero current (diodes).

Figure 3:
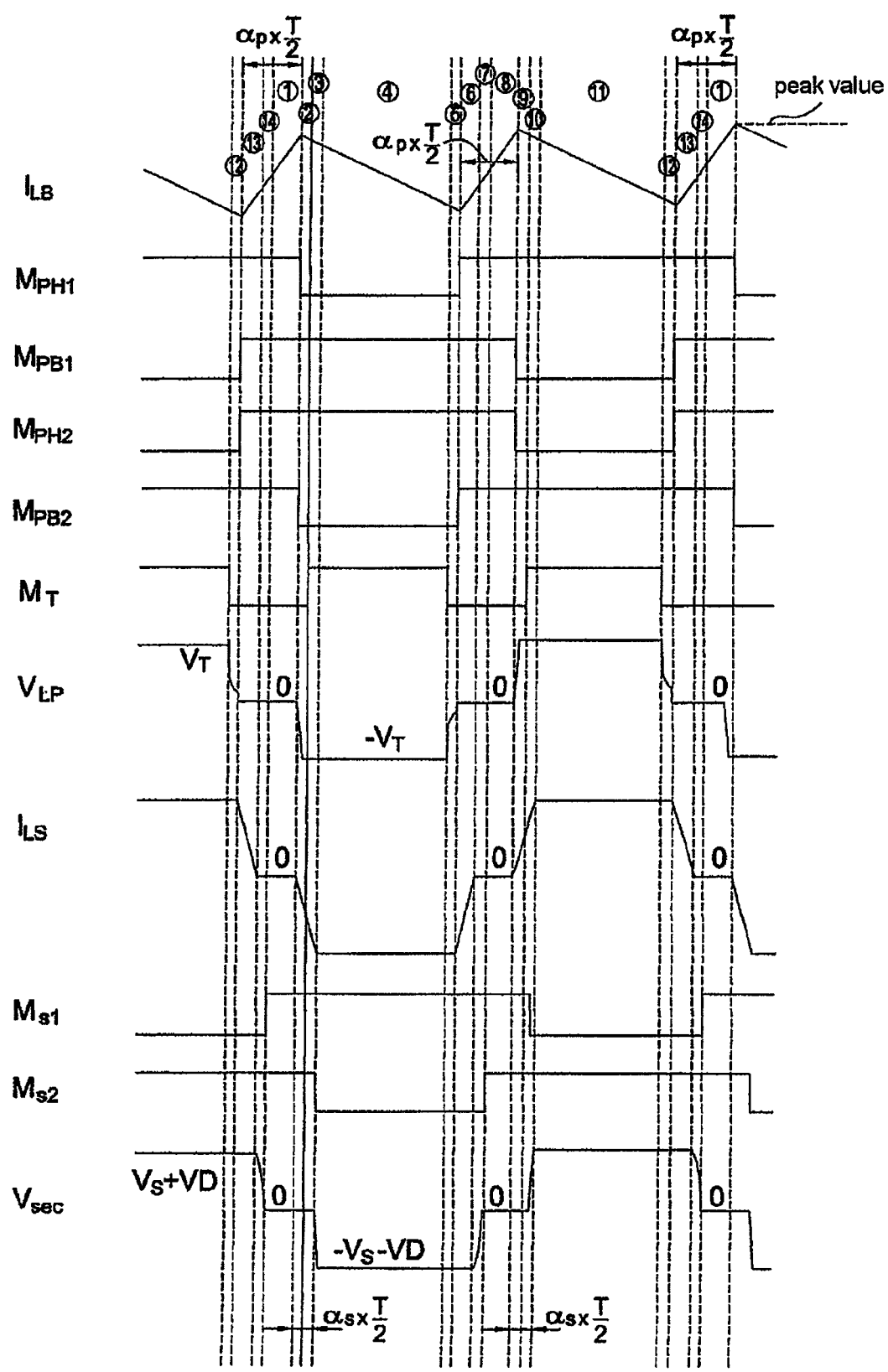
FIG. 3 is a timing diagram illustrating the various operating phases of the device of FIG. 1, with the shape of the various corresponding signals.

The timing diagram of FIG. 3 shows the 14 topological phases of a device according to the invention. These phases 1 to 14 are described in turn hereinbelow, in relation to the corresponding FIGS. 4 to 17.

Phase 1

Command relative to the preceding phase (phase 14): close $M_{s1}$.
State of the switches (FIG. 4):
Primary side: $M_{PH1}$, $M_{PH2}$, $M_{PB1}$, $M_{PB2}$ are all closed; $M_T$ is open.
Secondary side: $M_{s1}$ and $M_{s2}$ are closed.

In this phase 1, the behavior (FIG. 3) of the device is as follows: on the primary side, the input inductance $L_B$ is short circuited on the voltage source $V_E$. The current $IL_B$ in the inductance increases linearly at $V_E = L_B di/dt$, to a peak value which marks the end of phase 1: the voltage at the terminals of the primary winding $V_{LP}$ and the voltage at the terminals of the secondary winding are equal, and zero: $V_{LP} = 0 = V_{LS}$. The voltage $V_{SEC}$ is equal to the voltage at the terminals of the coupler, which is also zero: $V_{SEC} = 0 = V_{LC}$.

Phase ②

Change compared to the preceding phase: opening of $M_{PH1}$ and $M_{PB2}$.
This open command takes place at zero voltage, that is, at the moment of switching, the voltage $V_{LP}$ at the terminals of the primary winding is zero.
State of the switches (FIG. 5):
Primary side: $M_{PH2}$, $M_{PB1}$ are closed, and $M_T$, $M_{PH1}$ and $M_{PB2}$ are open.
Secondary side: $M_{s1}$ and $M_{s2}$ are closed.

In this phase ②, the voltage at the terminals of the primary winding $V_{LP}$, previously zero, falls to a value $-V_T$ at which the diode $D_T$ of the active buffer stage starts to conduct. The voltage $V_{LP}$ is then fixed and equal to $-V_T$, and causes the current in the coupling inductance $L_C$ to rise.

Phase ③

Change relative to the preceding phase: closure of the switch $M_T$.
State of the switches (FIG. 6):
Primary side: $M_{PH2}$, $M_{PB1}$, $M_T$ closed; $M_{PH1}$, $M_{PB2}$ open.
Secondary side: $M_{s1}$ and $M_{s2}$ closed.

The change of phase, to switch from the phase ② to the phase ③, should occur on detection of zero voltage on the voltage $V_{LP}$ and/or at the end of a waiting time that is sufficient to ensure that the voltage at the terminals of the switch $M_T$ is zero at the moment when it is switched to the closed state. The closure of $M_T$ ensures the bidirectionality of the current, such that the capacitance CT can be charged and discharged. The voltage $V_T$ can thus remain fixed.

The voltage $V_{LP}$ at the primary of the transformer is still equal to $V_T$. This causes the current to drop in the coupling inductance $L_c$.

Phase ④

Change relative to the preceding phase: opening of $M_{s2}$
State of the switches (FIG. 7):
Primary side: $M_{PH2}$, $M_{PB1}$, $M_T$ closed; $M_{PH1}$, $M_{PB2}$ open.
Secondary side: $M_{s1}$ closed; $M_{s2}$ open.

The open command applied to the controlled switch $M_{s2}$ terminates the energy storage phase in the coupling inductance $L_c$. It therefore provides a way of controlling the quantity of energy available to the secondary, by controlling the current in the coupling inductance.

The diode $D_{s2}$ starts to conduct. The current is distributed to the load.

The voltage $V_{sec}$ applied between the secondary terminals $E_{s1}$ and $E_{s2}$ reaches the value $-V_S - V_D$, where $V_D$ is the voltage drop in the conducting diode (and $V_S$ the output voltage distributed to the load).

Phase ⑤

Change relative to the preceding phase: opening of $M_T$
State of the switches (FIG. 8):
Primary side: $M_{PH2}$, $M_{PB1}$, $M_T$ closed; $M_{PH1}$, $M_{PB2}$ open,
Secondary side: $M_{s1}$ closed; $M_{s2}$ open.

This phase ⑤ is a resonance phase between the primary resonance capacitance $C_{rp}$ and the coupling inductance $L_c$. On the opening of the switch $M_T$, the voltage $V_T$ is no longer applied directly to $C_{rp}$. The voltage at the terminals of $C_{rp}$ is no longer fixed and can therefore vary. The equivalent circuit is then the inductance $L_B$ in parallel with $C_{rp}$. The current present in the inductance $L_B$ is used to start a conventional resonance phase when a capacitor is associated with an inductance. For this resonance phase to occur, a nonzero and negative current value is needed at the outset in $M_T$. $I_{LB}$ denotes the value of the current in the inductance $L_B$, $I_P$ the value of the current entering into the H-configuration bridge, $I_T$ the value of the current in the buffer capacitor $C_T$ as described in FIG. 2.

The following applies: $I_T = I_{LB} - I_P$.

FIG. 2a is a graphic representation of the form of the currents $I_{LB}$ and $I_P$. I1 is the current value reached in the bridge on the opening of one of the secondary switches $M_{s1}$, $M_{s2}$.

The mean value of the input current $I_{LBmean}$ is Pout/Vin if, for the demonstration, the efficiency is considered to be close to 1, that is Pout=Pin. The output power of the Boost stage is Pout=$V_T*I_{Pmean}$. The mean value of the current delivered to the load $I_{Pmean}$ is less than I1*(1−αp).

Therefore $I_{LBmean}$=Pout/Vin and with the known relation in a boost in continuous conduction mode $V_T$=Vin/(1−αp). $I_{LBmean}$=Pout/$V_T$*(1−αp) is obtained. Therefore $I_{Pmean}$<I1* (1−αp).
Or, with (1−αp)>0,
I1>$I_{Pmean}$/(1−αp),
I1>Pout/VT*(1−αp),
and Pout/VT*(1−αp)=$I_{LBmean}$.
Therefore I1>$I_{LBmean}$.

Which shows that the current value in the switch $M_T$ will be negative, because $I_T = I_{LB} - I1$. With $I_{LBmean} > I_{LBmin}$, $I_{LBmean} - I1 < 0$, therefore $I_{LB} - I1 < 0$.

The resonance phase will be reflected in the voltage $V_{LP}$ changing to zero.

When the voltage of the voltage $V_{LP}$ changes to zero at the terminals of the primary winding, the controlled switches $M_{PH1}$, $M_{PB2}$ are ordered to close (phase 6).

Phase ⑥
Change relative to the preceding phase: closure of $M_{PH1}$, $M_{PB2}$.
State of the switches (FIG. 9):
Primary side: $M_{PH2}$, $M_{PB1}$, $M_{PH1}$, $M_{PB2}$ closed, $M_T$ open.
Secondary side: $M_{s1}$ closed; $M_{s2}$ open.

This phase is the start of the energy storage phase in the input inductance on the primary, short circuited on the input voltage source. The current $IL_B$ in the inductance increases with a slope by $V_E/L_B$[1]. The voltage $V_{LP}$ at the terminals of the primary winding is zero.

[1] Support to this amendment is found in FIG. 3 showing phase ⑥ ($I_{LB}$ curve); page 17, lines 20-21 <<the energy storage phase begun in the phase ⑥>>, and page 19, lines 11-14, of the litteral translation. "This phrase is the start of the energy storage phase in the input inductance ( . . . ). The current $I_{LB}$ in the inductance increases work a slope by $V_E/L_B$".

Phase ⑦
Change relative to the preceding phase: opening of the diode $D_{s2}$
State of the switches (FIG. 10):
Primary side: $M_{PH2}$, $M_{PB1}$, $M_{PH1}$, $M_{PB2}$ closed and $M_T$ open.
Secondary side: $M_{s1}$ closed; $M_{s2}$ open.

When the diode naturally opens (since the current passing through it is cancelled), an equivalent circuit associating in parallel an inductance $L_c$ and a capacitor $C_{rs}$ is obtained.

Since the capacitor is charged to −Vs, a resonance phase occurs which will enable $V_{SEC}$ between the secondary terminals $E_{s1}$ and $E_{s2}$ to pass back through zero. The voltage $V_{SEC}$ applied between the secondary terminals $E_{s1}$ and $E_{s2}$ passes back to zero and the switching of the switch $M_{s2}$ is performed at zero voltage, which provides for zero switching losses (phase 8).

Phase ⑧
Change relative to the preceding phase: closure of $M_{s2}$
State of the switches (FIG. 11):
Primary side: $M_{PH2}$, $M_{PB1}$, $M_{PH1}$, $M_{PB2}$ closed and $M_T$ open.
Secondary side: $M_{s1}$ and $M_{s2}$ closed.

On the primary, the current $IL_B$ in the inductance increases[2] linearly with a slope by $V_E/L_B$ to a peak value which marks the end of the energy storage phase begun in the phase ⑥: the voltage at the terminals of the primary winding $V_{LP}$ and the voltage at the terminals of the secondary winding are equal, and zero: $V_{LP} = 0 = V_{LS}$. The voltage $V_{sec}$ is equal to the voltage at the terminals of the coupler, which is also zero: $V_{sec} = 0 = V_{LC}$. This state is stable, and the voltages are zero on the inductances of the transformer and on Lc.

[2] See phase ⑧ FIG. 3 page 17, lines 20-21 of the litteral translation <<the energy storage phase begun in the phase ⑥>> and page 19, lines 11-14 of the litteral translation. "This phrase is the start of the energy storage phase in the input inductance ( . . . ). The current $I_{LB}$ in the inductance increases work a slope by $V_E/L_B$".

Phase ⑨
Change relative to the preceding phase: opening of $M_{PH2}$, $M_{PB1}$.
State of the switches (FIG. 12):
Primary side: $M_{PH1}$, $M_{PB2}$ closed, $M_{PH2}$, $M_{PB1}$ and $M_T$ open.
Secondary side: $M_{s1}$ and $M_{s2}$ closed.

In this phase ⑨, the voltage at the terminals of the primary winding $V_{LP}$, previously zero, rises to a value $+V_T$ at which the diode $D_T$ of the active buffer stage naturally starts to conduct. The voltage $V_{LP}$ applied to the primary of the transformer causes the current in the coupling inductance $L_c$ to rise.

Phase ⑩
Change relative to the preceding phase: closure of $M_T$
State of the switches (FIG. 13):
Primary side: $M_{PH1}$, $M_{PB2}$ and $M_T$ closed and $M_{PH2}$, $M_{PB1}$ open,
Secondary side: $M_{s1}$ and $M_{s2}$ closed.

The change of phase, to switch from the phase ⑨ to the phase ⑩, should occur on detection of zero voltage on the voltage $V_{LP}$ and/or at the end of an appropriate time to ensure a low voltage at the terminals of the switch $M_T$ before its closure. (In FIG. 13, the closure of $M_T$ is obtained after a waiting time that is sufficient to ensure that the voltage at its terminals is zero.) The closure of $M_T$ reduces the losses compared to the use only of the diode $D_T$. The voltage $V_{LP}$ at the primary of the transformer is still equal to $V_T$. This causes the current in the coupling inductance $L_c$ to rise.

Phase 11
Change relative to the preceding phase: opening of $M_{s1}$
State of the switches (FIG. 14):
Primary side: $M_{PH1}$, $M_{PB2}$ and $M_T$ closed and $M_{PH2}$, $M_{PB1}$ open[3],
Secondary side: $M_{s1}$ open and $M_{s2}$ closed The open command applied to the controlled switch $M_{s1}$ terminates the energy storage phase in the coupling inductance $L_c$. It therefore provides a way of controlling the quantity of energy available to the secondary, by controlling the current in the coupling inductance.

The diode $D_{s1}$ starts to conduct. The current is distributed to the load.

The voltage $V_{sec}$ applied between the secondary terminals $E_{s1}$ and $E_{s2}$ reaches +Vs+VD, where VD is the voltage drop in the conducting diode (and Vs the output voltage distributed to the load).

[3] See phase 12 page 18 and FIG. 15 of the litteral translation: $M_{PH1}$ and $M_{PB2}$ are closed. And there is no change on $M_{PH1}$ and $M_{PB2}$ in phases 13 and 14—see page 19, lines 7 and 17 respectively of the litteral translation.

Phase 12
    Change relative to the preceding phase: opening of $M_T$
    State of the switches (FIG. 15):
    Primary side: $M_{PH1}$, $M_{PB2}$ closed and $M_{PH2}$, $M_{PB1}$ and $M_T$ open,
    Secondary side: $M_{s1}$ open and $M_{s2}$ closed This phase 12 is a resonance phase between the primary resonance capacitance $C_{rp}$ and the coupling inductance $L_c$ as described in the phase (5). When the voltage of the voltage $V_{LP}$ changes to zero at the terminals of the primary winding, the open controlled switches of the primary, that is $M_{PH2}$, $M_{PB1}$, are ordered to close (phase 13).

Phase 13
    Change relative to the preceding phase: closure of $M_{PB1}$ and $M_{PH2}$
    State of the switches (FIG. 16):
    Primary side: $M_{PB1}$, $M_{PH1}$, $M_{PB2}$, $M_{PH2}$ closed and $M_T$ open,
    Secondary side: $M_{s1}$ open and $M_{s2}$ closed This phase is the start of the energy storage phase in the input inductance on the primary, short circuited on the input voltage source. The current $I_{LB}$ in the inductance increases with a slope by $V_E/L_B$. The voltage $V_{LP}$ at the terminals of the primary winding is zero.

Phase 14
    Change relative to the preceding phase: opening of the diode $D_{s1}$
    State of the switches (FIG. 17):
    Primary side: $M_{PB1}$, $M_{PH1}$, $M_{PB2}$, $M_{PH2}$ closed and $M_T$ open,
    Secondary side: $M_{s1}$ and $M_{s2}$ closed When the diode $D_{s1}$ opens naturally (since the current passing through it is cancelled), an equivalent circuit associating in parallel an inductance $L_c$ and a capacitor $C_{rs}$ is obtained. Since the capacitor is charged to Vs, a resonance phase occurs which will enable the voltage $V_{sec}$ between the secondary terminals Es1 and Es2 to pass back through zero. The switch to the closed state of $M_{s1}$ occurs at zero voltage, which results in zero switching losses (phase 1).

A power transfer device according to the invention that has just been described provides for a reduction in the losses of around 15 to 30% compared to the structures of the state of the art, thanks to the regulation on the secondary using the leakage inductance of the transformer as an energy storage element, while retaining a wide input voltage dynamic range of the order of 2 to 5 and a high transformation ratio between output voltage and input voltage of the order of 20 to 30 thanks to the voltage step-up stage of the primary. This is obtained without stressing the components, in particular by the switching of the controlled switches at zero voltage, and at zero current in the diodes.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only definition contained in the appended claims and equivalents thereof.

The invention claimed is:

1. An insulated power transfer device connected to an output load connected between a first output terminal and a second output terminal, comprising a DC voltage source and a magnetic coupler comprising
    a transformer with a primary winding between two primary terminals, a secondary winding in series with a coupling inductance between two secondary terminals, said coupling inductance comprising at least the leakage inductance of the transformer;
    a rectifier bridge comprising two diodes, each diode connected between a respective secondary terminal and the first output terminal, and two controlled switches, each controlled switch being connected between a respective secondary terminal and the second output terminal, and
    a secondary controller of said controlled switches able to set them simultaneously to the closed state for an energy storage time,
    and comprising on the primary side a voltage step-up circuit comprising:
    an input inductance in series with the DC voltage source;
    an active buffer stage in parallel with the series assembly formed by the input voltage source and the series inductance, said stage comprising a controlled switch with a peak-clipping diode in parallel, connected in series with a capacitor, said switch being connected to the inductance and said capacitor at the source,
    a first and a second pair of controlled switches in series, each pair connected in parallel with the active buffer stage and the connection point between the two switches of each pair being linked to a respective primary terminal, and
    a primary controller of the switches of said pairs able to set them simultaneously to the closed state for an energy storage time, to short circuit the inductance on the input voltage source,
and in that the primary and secondary controllers provide independent regulation, the primary controller controlling the energy storage time on the primary to regulate the voltage at the terminals of the capacitor of the active buffer stage at a peak input voltage value, and the secondary controller controlling the energy storage time on the secondary to regulate the output voltage.

2. The device as claimed in claim 1, wherein said energy storage time on the secondary is controlled by said secondary controller by a current measurement in the output load.

3. The device as claimed in claim 1, wherein said coupling inductance comprises the leakage inductance of the transformer and an additional inductance which can be on the primary and/or secondary winding.

4. The device as claimed in claim 1, wherein said primary and secondary controllers apply the commands to switch the switches at zero voltage.

5. The device as claimed in claim 1, wherein the diodes switch at zero current.

6. The device as claimed in claim 1, wherein said primary controller comprises a cell for detecting a voltage drop on the terminals of the switch of the active buffer stage.

7. The device as claimed in claim 1, wherein said primary controller comprises a cell for detecting a peak current value in the step-up inductance.

8. The device as claimed in claim 1, wherein said controlled switches are semiconductor-type switches.

9. The device as claimed in claim 2, wherein said primary and secondary controllers apply the commands to switch the switches to zero voltage.

10. The device as claimed in claim 2, wherein the diodes switch at zero current.

* * * * *